United States Patent
Shagam et al.

[19]

[11] Patent Number: 6,014,517
[45] Date of Patent: Jan. 11, 2000

[54] AUTOMATIC CREATION OF C TO ASSEMBLER INTERFACE

[75] Inventors: Eli Shagam, Brookline, Mass.; Avihu Goral, Yuvalim, Israel

[73] Assignee: EMC Corporation, Hopkinton, Mass.

[21] Appl. No.: 09/003,579

[22] Filed: Jan. 6, 1998

[51] Int. Cl.[7] .................................................. G06F 9/44
[52] U.S. Cl. ............................................................ 395/705
[58] Field of Search .............................................. 395/705

[56] References Cited

U.S. PATENT DOCUMENTS

| | | | |
|---|---|---|---|
| 5,446,902 | 8/1995 | Islam ........................................ | 395/703 |
| 5,613,122 | 3/1997 | Burnard et al. .......................... | 395/701 |
| 5,778,358 | 7/1998 | Blackman et al. ......................... | 707/3 |
| 5,799,313 | 8/1998 | Blackman et al. ....................... | 707/103 |
| 5,842,204 | 11/1998 | Andrews et al. ............................ | 707/3 |

OTHER PUBLICATIONS

Gabriel, R., The Automatic Generation of Graphical User Interfaces, IEEE, 1–2 and 330–339, Apr. 1988.

Leong, Y et al., The Automatic Generation of Bus–Interface Models, IEEE, 1–2, Jun. 1992.

Fidan, I et al., An Object–Oriented User Interface for Controlling a Multi–Purpose Robot Cell, IEEE, 1–2, Sep. 1995.

Myers, B., et al., Marquise: Creating Complete User Interfaces by Demonstration, ACM, p. 293–300, Apr. 1993.

Wolber, D. et al., Creating Real Time Animated Interfaces With Stimulus Response Demonstration, ACM, p. 5–6, May 1995.

Romahn, S. et al., Creating Intelligent User Interfaces Using Prototyping and Knowledge Based Support Technologies, p. 259–262, 1992.

*Primary Examiner*—Tariq R. Hafiz
*Assistant Examiner*—John Q. Chavis
*Attorney, Agent, or Firm*—Maureen Stretch

[57] ABSTRACT

A system for parsing comments in assembler language source code to identify input and output parameters and script them into wrapper code that transforms the parameters from C (or other higher level language) conventions to assembler conventions for entry to the assembler program and from assembler conventions to C conventions for exit from the assembler program. The comment parser follows the syntax conventions of the assembler to identify text that is intended to be comments. Within the comment text, the comment parser searches for user specified defining terms such as "input", "output", or "at entry", and "at exit", which indicate that one or more input or output parameters are described. Next the comment parser searches for nearby formatters, such as obvious register references "d3" or "a4" in one implementation. The comment parser saves the comments and associated registers in an associative array. The wrapper scripter then uses the associative array to script a wrapper for this assembler program that will reformat the inputs and outputs appropriately. The resulting wrapper is checked by the programmer for errors, and if none are found, is used as the wrapper for the interface.

12 Claims, 10 Drawing Sheets

Fig. 2
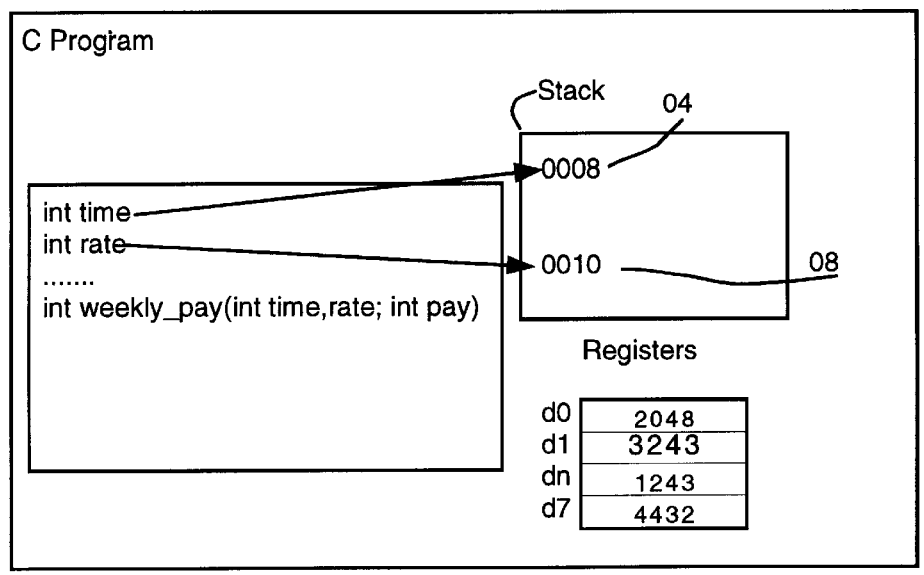
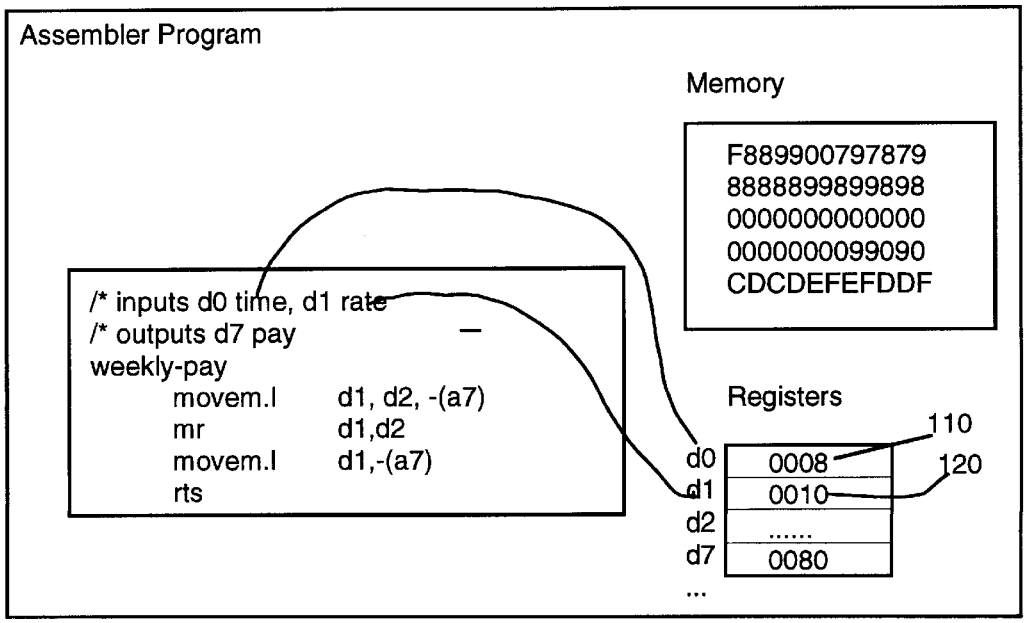

Fig. 3

```
                ┌─────────────────────────────────────────────┐
name ─────────│ clear_memory_routine:                        │
              ├─────────────────────────────────────────────┤
comments      │ at entry:                                    │
         ╱    │   a6 ------ word address (32 gb space)       │
        ╱     │   d5 ------ word count (# of 8-byte words)   │
              │   d3 ------ pattern to write.                │
              │                                              │
              │ at exit:                                     │
              │   d7 ------ return code (00=o.k.)            │
              ├─────────────────────────────────────────────┤
code ─────────│ loop   movem.l    d3,a6                     │
              │        sub.l      #1,d5                     │
              │        add.w      #4,a6                     │
              │        cmpi       #0,d5                     │
              │        bne        loop                      │
              │        ........                              │
              │        .......                               │
              │        ......                                │
              │        .....                                 │
              └─────────────────────────────────────────────┘
```

Fig. 4

```
                ┌─────────────────────────────────────────────────────┐
name ─────────│ memory_boards_service_write:                        │
              ├─────────────────────────────────────────────────────┤
comments      │ input:  d0 - slot number.                            │
        ╲     │         d3 - data to write to memory board.          │
         ╲    │         d4 - command:                                │
              │                                                      │
              │ output: d7 - operation status [00 = ok ; ff = error] │
              │                                                      │
              │                                                      │
              │                                                      │
              ├─────────────────────────────────────────────────────┤
code ─────────│ setup  movem.l   d0, disk_slot                       │
              │        movem.l   d4, disk_command                    │
              │        ..........                                    │
              │        ..........                                    │
              │        ..........                                    │
              └─────────────────────────────────────────────────────┘
```

| | |
|---|---|
| 440 | input |
| 442 | inputs |
| 444 | output |
| 446 | outputs |
| 448 | at entry |
| 450 | at exit |
| 452 | ..... |
| 454 | .... |
| 456 | .... |
| 458 | ..... |

| | |
|---|---|
| 460 | d0 |
| 462 | d1 |
| 464 | d2 |
| 466 | d3... |
| 468 | a0 |
| 470 | a1 |
| 472 | a2... |
| 474 | (*) |
| 476 | ....... |
| 478 | ..... |

480

| | Argument name | Register | Type |
|---|---|---|---|
| 482 | time | d3 | I |
| 484 | gross_pay_amount | d7 | O |

| 490 | 491 | 492 | 493 | 494 | 495 |
|---|---|---|---|---|---|
| prompt> | ../p/wrap.pl | services.s | clear_memory_routine | a1:name1 | a2:name2... |

Fig. 5

| | |
|---|---|
| 500 | lss6205-Eli-108-sym4> ../p/wrap.pl services.s clear_memory_routine a1:name1 a2:name2 |
| 505 | \| <br> \| at entry: <br> \| a6 ------ word address (32 gb space) <br> \| d5 ------ word count (# of 8-byte words) <br> \| d3 ------ pattern to write. <br> \| <br> \| at exit: <br> \| d7 ------ return code (00=o.k.) <br> \| |
| 510<br>515 | \| ULONG clear_memory_routine(ULONG word_count, ULONG pattern_to_write, <br> ULONG word_address, ULONG name2, ULONG name1) |
| | _clear_memory_routine: <br>    movem.l a1/a2/a6/d3/d5/d7,-(a7) <br>    move.l 28(a7),d5   word_count <br>    move.l 32(a7),d3   pattern_to_write <br>    move.l 36(a7),a6   word_address <br>    move.l 40(a7),a2   name2 <br>    move.l 44(a7),a1   name1 <br>    bsr    clear_memory_routine <br>    move.l d7,d0   return_code <br>    movem.l (a7)+,a1/a2/a6/d3/d5/d7 <br>    rts |
| 525 | lss6205-Eli-109-sym4> |

Fig. 6

| | |
|---|---|
| 600 | lss6205-Eli-110-sym4> ../p/wrap.pl services.s |
| 605 | memory_boards_service_write<br>\|<br>\| input: d0 - slot number.<br>\|        d3 - data to write to memory board.<br>\|        d4 - command:<br>\|<br>\| output: d7 - operation status [00 = ok ; ff = error]<br>\| |
| 610 | \| ULONG memory_boards_service_write(ULONG command, ULONG data_to_write_to_memory_board, ULONG slot_number) |
| 615 | _memory_boards_service_write:<br>    movem.l d3/d4/d7,-(a7)<br>    move.l 16(a7),d4  command<br>    move.l 20(a7),d3  data_to_write_to_memory_board<br>    move.l 24(a7),d0  slot_number<br>    bsr  memory_boards_service_write<br>    move.l d7,d0  operation_status<br>    movem.l (a7)+,d3/d4/d7<br>    rts |
| 620 | lss6205-Eli-111-sym4> |

AUTOMATIC CREATION OF C TO ASSEMBLER INTERFACE

BACKGROUND OF THE INVENTION

1. Field of the Invention

This invention relates generally to the field of computer programming tools and more particularly to the field of tools for creating interfaces between programming languages.

2. Background

In many computer systems today, programs can be written in any of a number of languages but almost all computer systems have some form of assembler language. Most computers also have compilers that allow programmers to use what are called higher level languages. However, when new programs written in one language have to communicate with programs written in another language, it can be time consuming for the programmer to figure out what data must be communicated between the programs in the two different languages, how to communicate it, and in which format. This is especially so if there are large conversion projects, in which programs written in one language, such as assembler, are being converted gradually to another language such as C.

Assembler language uses the basic instruction set of the particular machine in a symbolic "shorthand" that usually includes the ability to make references to addresses and registers. A typical series of assembler instructions might look like:

| label | instruction | operand(s) | comments |
|---|---|---|---|
| * | | | Comments |
| * | | | input: d0 is slot number |
| * | | | d4 is counter number |
| * | | | output: d4 is counter address |
| handlecounter: | | | |
| | move.1 | d0,a3 | |
| | add.w | #4,d4 | |
| | move.w | sr,-(a7) | |
| | move.w | #$2600,sr | make status error code for length |
| | rts | | |

In this example, each line contains data in assembler language format. The lines starting with an asterisk (*) symbol indicate to the assembler program that will translate this into binary machine language that they are comment lines. The next 6 lines are actual code, which may have labels (such as "handlecounter") or include instructions such as "move.1". A move instruction such as move.l works on operands, here registers d0 and a3. Finally, line by line comments, such as "make status error code for length" on the next to last line are separated from the operands on that line by one or more blank spaces.

Higher level languages usually allow the programmer to solve the same problem as an assembler language program might, but usually with fewer lines of code. Where the hypothetical assembler language program above takes 6 lines of actual code, a programmer using a higher level language might be able to achieve the same results in one line, such as:

Incr address by 4, set status_indicators=0.

In addition, higher level languages are also designed to be easier to read, understand and maintain. Compiler programs take the statements written in the higher level languages and turn them into machine language instructions in binary.

Historically, however, it had been true that where speed of execution was important, or where available memory for programs was limited, writing a program in assembler language was usually preferable to writing it in a higher level language. This was so because assembler language programs could be specifically written for optimal speed, or optimal memory use or both. Higher level language programs tended to result in machine code that was frequently not as fast in execution and often much larger in size than machine code resulting from an assembler language program. Consequently, large numbers of systems programs—those which directly control hardware in a computer system, such as the operating system or the file system or the microcode for controllers and disks systems—have been written in assembler language.

Now, however, as processor speeds have increased significantly, and costs of memory have gone done greatly, higher level languages such as C and C++ and others can be used for many systems programming functions and still provide acceptable speed. The C and C++ languages are particularly suited for this purpose, as they have some features that more closely resemble assembler languages. Since programs written in higher level languages are usually easier to write and maintain, many assembler language programs are now being converted to higher level languages. Writing in a higher level language also means the programs can be much more easily "ported" or re-compiled for other machines with different instruction sets.

Most systems programs written in assembler, such as operating systems or file systems, are usually made up of a large number of individual programs which are eventually linked together into a larger, executable form. As new programs written in C are added to incorporate a new feature such as a new device driver, they need to be compatible with the existing assembler programs. In the same way, as existing assembler programs are converted to C, they, too, need to be compatible with the other assembler programs still in the file system. To be compatible, the C programs usually need to be able to receive data from the existing assembler programs and send data back to them. Such information items that are sent between programs are often called parameters or arguments.

When large or complex production or product systems are undergoing conversions such as this it is usually not practical or desirable to convert all the code at once. Instead, it is preferable to convert the assembler code to the higher level language piece by piece. This keeps the mixed system alive, usable and testable.

Presently, compatibility between programs in two different languages is usually achieved manually by the programmers involved, in order to overcome some of the confusion caused by different conventions in parameter passing between the languages. When a C program written for the Motorola 68000 CPU, for example, calls another program, it is usually done as a function call and parameters are passed on what is known as the stack—an area of memory pointed to by a stack pointer register. The stack contains a last-in-first-out list of items. In the C programming language, the called function usually returns a value to the calling program in a register. Most compilers for a given machine will produce code that returns the value from a function call in the same register. For the Motorola 68000 processor, for example, C compilers will put the return value in register d0, for data, or register a0 for pointers. However, assembler programs may pass parameters in registers and not on the stack, or with a return value in a different register from that which is expected by a C program.

For example, an assembler program that calculates a weekly pay amount might expect to receive as inputs a time value representing the number of hours worked, and a rate value, indicating the hourly pay rate. The output from the program would be the weekly pay. A typical assembler program might be written to receive the time value in register d0, the rate value in register d1, and might store the result in register d7. As can be seen in FIG. 2, when the calling C program is compiled, the compiler may have allocated the integers time and rate to stack offsets 04 and 08, with values 0008 and 0010 in decimal. The register contents for registers d0–d7 do not contain these values. The stack pointer in register a7 in this example, points to the values. If this C program calls the assembler program shown in FIG. 2, the assembler program will expect time and rate to be inputs, but it expects the values for those inputs to be in registers d0 and d1, respectively, not at offsets from the stack. Since the computed result from the assembler program is in register d7 it is already using a convention of register usage that differs from that used by many C compilers. If this C program must call this assembler program, the C programmer needs to know what the assembler program expects as inputs and how it returns outputs so that the C programmer can write the function calls and define the variables appropriately.

To do this, the C programmer today would look at the source code and documentation for the assembler program, and check to see how it expects to get and return these parameters. Usually the programmer is helped by the documentation appearing in the source code in the form of comments. For large conversion projects, in which assembler programs that are part of a large system are being converted to C, it can be time-consuming to do this manually, taking anywhere from several minutes to several hours or even several days, depending on the number of programs to be converted at any given time.

In addition, because the new program is being written in C, it is likely that the C compiler will create variables in a format that is different from that expected by one or more of the assembler programs being called, as mentioned in the example of the return value, above. When this occurs, the programmer often has to write what is called a "wrapper" which translates the variables from the C format to the format expected by the assembler program for input and from the assembler program format to C format for output. Most typically a wrapper would be several lines of assembler code that take the variables in C format and transform them to the format expected by the assembler program. It would also include a call or branch to the assembler program and then, upon the return from the assembler program, a manipulation of the registers to put them in the state expected by the C program, and finally a return to the C program. Thus the original assembler code is "wrapped" in more assembler code that converts the parameter formats so the assembler program can be called by a C program.

The more assembler programming of wrappers the C programmer has to do, the more chances there are for errors to occur in minor details, such as computing offsets from a stack to save and restore registers or values or writing the assembler punctuation and syntax incorrectly. In larger conversion projects, the task of writing wrappers for tens or hundreds of assembler programs also tends to be repetitive and usually not the most effective use of a programmer's time.

It is an object of this invention to reduce the amount of programmer time required to achieve this type of interface by automating more of the process of identifying and creating the interface between a program written in a higher level language and one written in assembler.

It is another object of the present invention to decrease the likelihood of errors in the creation of an interface for a program being called by a higher level language.

SUMMARY OF THE INVENTION

These and other objects are achieved by a system for parsing comments in assembler language source code to identify input and output parameters and script them into wrapper code that transforms the parameters from C (or other higher level language) conventions to assembler (or other programming) conventions for entry to the assembler program and from assembler conventions to C conventions for exit from the assembler program. The comment parser follows the syntax conventions of the assembler to identify text that is intended to be comments. Within the comment text, the comment parser searches for user specified defining terms such as "input", "output", "at entry", or "at exit", which indicate that one or more input or output parameters are described. Next the comment parser searches for nearby formatters, such as obvious register references like "d0" or "a7" in one implementation. The comment parser saves the comments and associated registers in an associative array. The wrapper scripter then uses the associative array to script a wrapper for this assembler program that will reformat the inputs and outputs appropriately. The resulting wrapper is checked by the programmer for errors, and if none are found, is used as the wrapper for the interface.

It is an aspect of the present invention that it significantly reduces the amount of time needed to prepare wrappers for assembler modules.

Another aspect of the present invention is that the automatic creation of wrappers by computer also enables electronic editing of the wrappers, if desired.

Still another aspect of the present invention is that it tends to reduce the number of errors in the resulting wrappers, since such things as offsets from the stack register are calculated by machine, and not by hand.

Yet another aspect of the present invention is that it allows a C programmer to assign argument names to parameters which are unnamed in the original assembler program.

BRIEF DESCRIPTION OF THE DRAWINGS

FIG. 2 is a schematic representation showing how programs in different languages might store and refer to data.

FIG. 3 is a sample of assembler code and comments.

FIG. 4 is a another sample of assembler code and comments.

FIG. 5 is an example of a C prototype and a wrapper in assembler created by the present invention to interface an assembler program to a C program.

FIG. 6 is another example of a C prototype and a wrapper in assembler for an assembler program as created according to the method and apparatus of the present invention.

DETAILED DESCRIPTION OF THE INVENTION

Figure 1A:
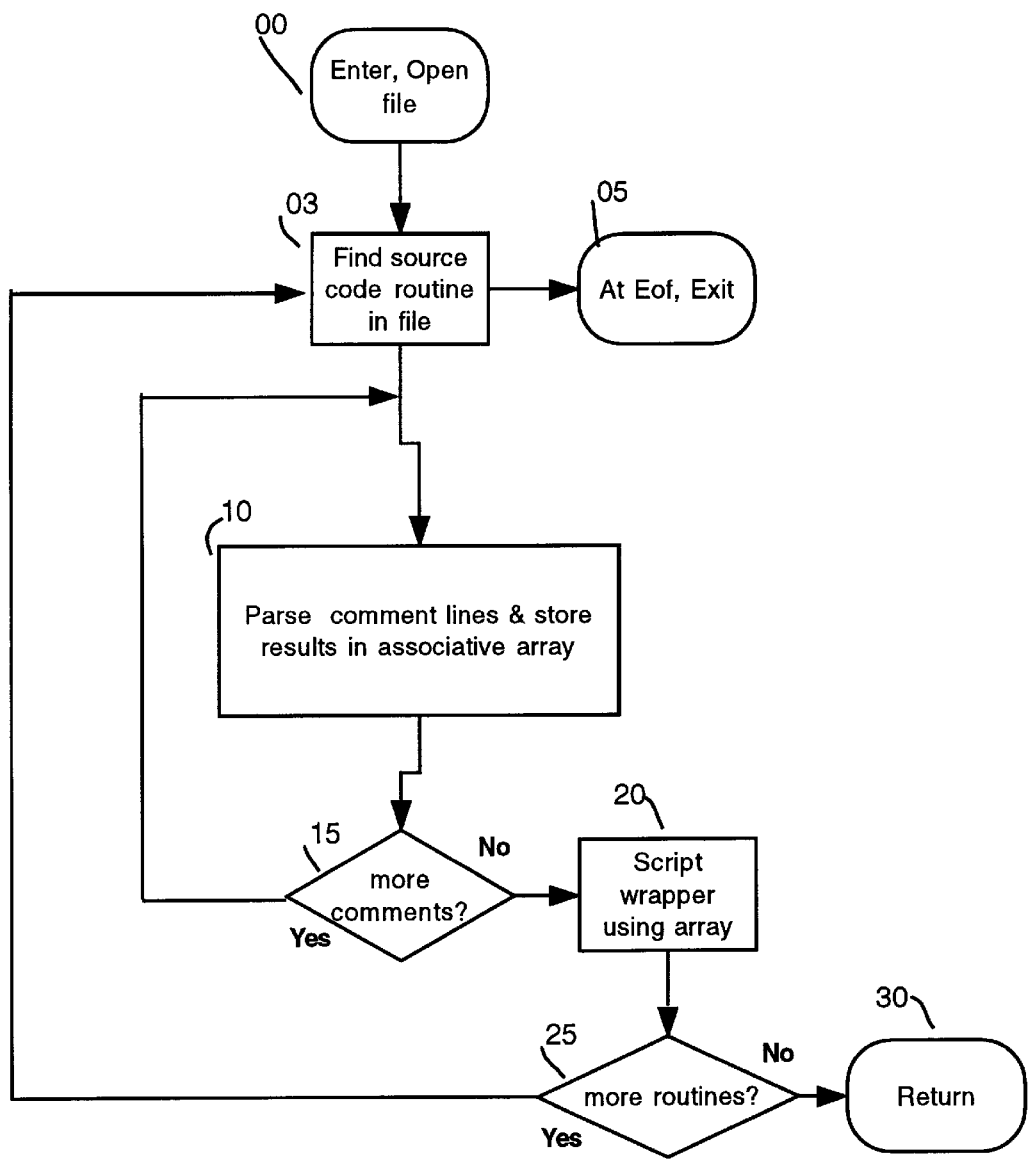
FIG. 1a is an overview flow diagram of the present invention.

In FIG. 1a, an overview flow diagram of the present invention is shown. The examples shown here and in other drawings assume that a C program is being written to interface with an assembler program originally written for a Motorola 68000 CPU. As will be apparent to those skilled in the art, other higher level languages, such as C++ or Pascal or ADA and others and other assembler languages, such as Motorola PowerPC, Intel 8086 or Pentium, and IBM MVS assembler could be used, instead, without deviating from the spirit of the invention.

In FIG. 1a, at step 00 the present invention is entered, by means of an interactive prompt in a preferred embodiment. Turning briefly to the hardware configuration shown FIG. 1d, the present invention opens the source code file 60 for which interface services are desired. As seen in FIG. 1d, a preferred embodiment of the present invention is implemented on a computer 45 having an interactive display 40 and one or more disks 50 and 55.

Returning now to FIG. 1a, at step 03, the present invention locates the source code routine that was requested by the user in the prompt. Those skilled in the art will appreciate that large systems written in assembler may have many programs or routines stored in one source code file. Turning briefly to FIG. 1e, an expanded view of disk 50 is shown, having source code file 60, which contains a number of routines in assembler language. While a preferred embodiment reads such a source code file 60 in from a disk, those skilled in the art will appreciate that the source code could be stored on any machine readable medium.

Once the requested routine has been found, the invention proceeds to step 10, of FIG. 1a to parse the comment lines and store the results in an associative array. As will be explained in more detail below, the present invention uses the commented section of the assembler code to identify the arguments to be passed and build the wrappers to interface the assembler program to the newly developed C program. Once the invention has determined at decision block 15 that there are no more comments to be parsed for this routine, it proceeds to script wrapper 20, to script a wrapper using the results previously stored in the array. Once that is completed, the invention checks to see if the user wishes to interface more routines at step 25. If yes, the invention goes back to step 03 to find the next routine specified by the user. If no more routines are being interfaced the invention returns at step 30. Similarly, when the end of file has been reached as detected at step 05, the present invention exits.

Figure 1B:
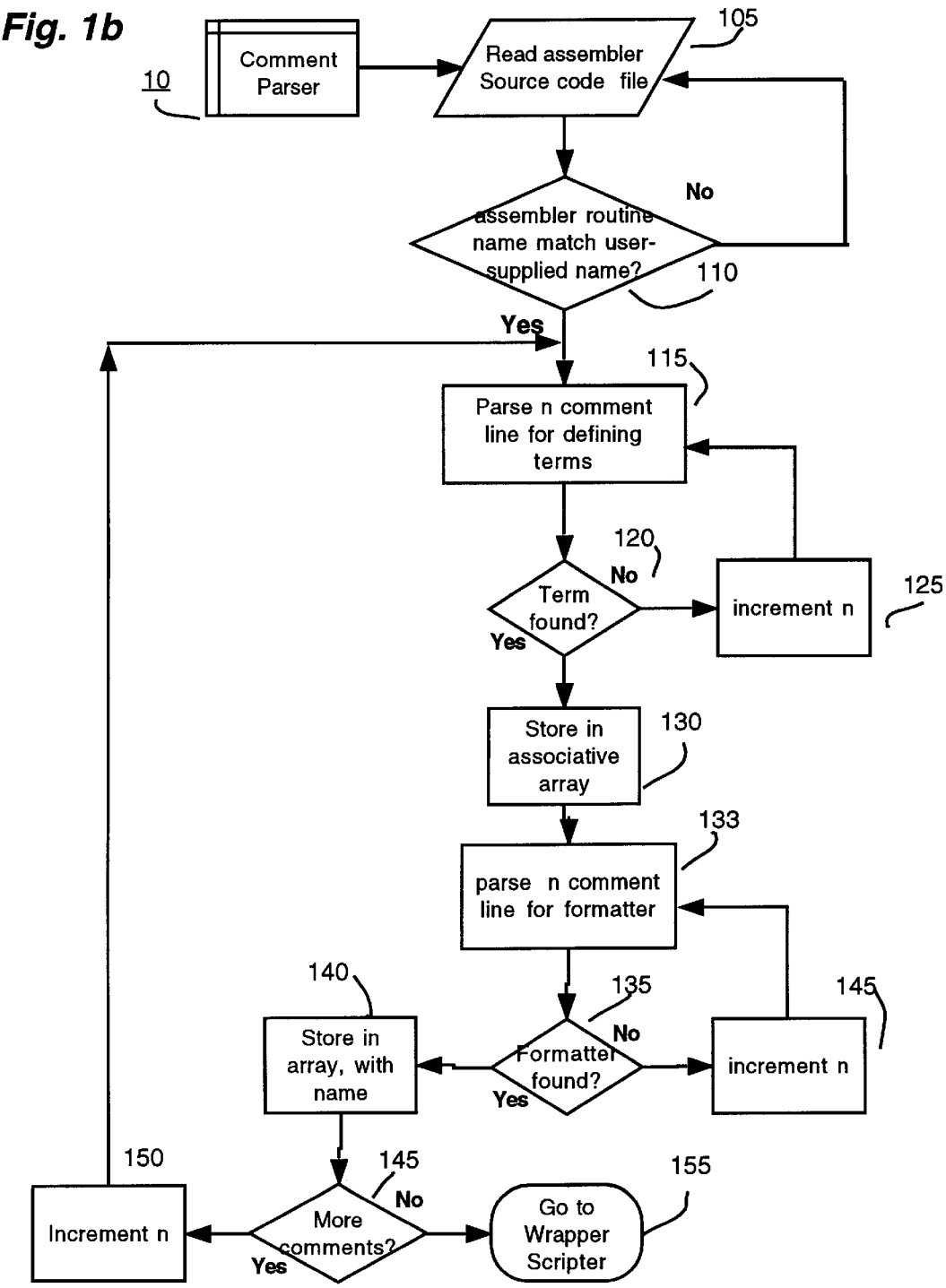
FIG. 1b is a flow diagram of the comment parser of the present invention.

Now turning to FIG. 1b, a more detailed flow diagram of comment parser 10 is shown. At step 105, comment parser 10, reads as input the source code for the target assembler program which will be called by the C program or calling program. At decision block 110, the invention checks to see whether the assembler routine name supplied by the user in the prompt (described in more detail below) matches a routine name in the source code file. If it does, the invention proceeds to step 115. If not, the invention returns to step 105 to continue reading through the file. Next, at step 115, comment parser 10 locates the comments in the text of the source code, using the syntax conventions of the assembler language in questions. Those skilled in the art will appreciate that comments, as distinct from instructions and operands, are usually separated from the actual instructions by special characters, a series of blank spaces or similar conventions. Good programming practices suggest that most programs will have an introductory comments section that describes the input and output to and from this routine, as well as an overview of its functions. For the purposes of the present invention, the description of inputs and outputs are the focus point. If the assembler code does not have input/output documentation or the documentation is incomplete or incorrect, it is also good practice to complete or correct the documentation using the present invention. A preferred embodiment helps to verify the correctness and completeness of the documentation since any mistakes in the documentation will cause code to fail when it is called by the wrapper generated with incorrect or incomplete documentation. The present invention focuses on descriptions of the inputs and outputs in the documentation that is identified as comments.

In FIGS. 3 and 4, this can be seen more clearly. In FIG. 3, for example, assembler code formatted for the GNU assembler is shown. This routine's name is "clear_memory_routine:". The comments section includes all the lines set off by the vertical bar "|". The actual code starts at the line labelled "loop". In FIG. 4, the name of the routine is "memory_boards_service_write:" and the comments section includes the description of the inputs and outputs. The code begins with the line labelled "setup". Once a comments section such as those in FIGS. 3 or 4 has been located, comment parser 10 looks for defining terms.

Figures 4A, 4B, 4C, 4D:
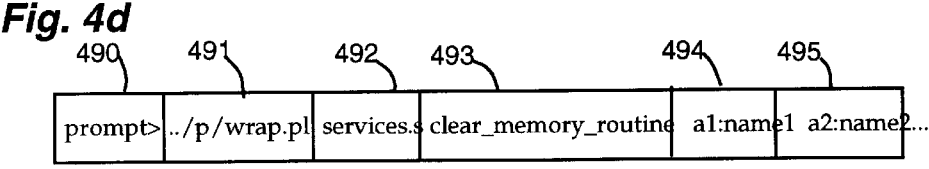
FIG. 4a is a list of illustrative defining terms according to the method and apparatus of the present invention.
FIG. 4b is a list of illustrative "formatters" according to the method and apparatus of the present invention.
FIG. 4c is a schematic drawing of an associative array according to the method and apparatus of the present invention.
FIG. 4d is a schematic drawing of the inputs to the present invention.

Referring briefly to FIG. 4a, some typical defining terms are listed there, such as "input", "output", "at entry", "at exit", etc. Most programs, whether written in assembler or other languages will usually have at least some minimum level of comments describing the primary inputs and outputs of that program. Where large scale conversion projects are underway involving numerous assembler programs that form a system, it is highly likely that there will be significant uniformity in the nature of these comments. The designers and programmers who wrote the original assembler code for such projects usually develop informal internal standards for comments to make it easier for the team to debug and support the programs. Since different programmers are also likely to produce somewhat different results as a matter of style, the present invention can be programmed to accommodate several user-specified variations of defining terms. For example, if programmer A writes comments in the form:

| * input  | d1 | time            |
| *        | d2 | rate            |
| * output | d7 | gross pay amount |

| * at entry | d1 | time worked    |
| *          | d2 | rate of pay    |
| * at exit  | d7 | gross pay value | the present invention is programmed to treat input, output, at entry, and at exit as defining terms. Those skilled in the art will appreciate that additional terms could be used, or different terms or sets of terms could be used to correspond to the internal conventions used in the programs being converted.

Returning now to FIG. 1b, after locating such a defining term at step 115 the present invention, at step 130, stores it in an associative array (described in more detail below) and proceeds to find a formatter near it at step 133. According to the method and apparatus of the present invention, formatters are terms that are usually unique to that particular assembler language. For example, as shown in FIG. 4b, a list of formatters for a computer using the Motorola 68000 instruction set is shown. In the assembler language for that computer chip set, there are conventions for the use of register names, stack pointers and so on. Thus if a comment in a program written for the Motorola 68000 cpu says "input d0", comment parser 10 knows that this means that the input is expected to be in register d0. On the same computer, a7 is the register for the stack. For Intel 8086 and Pentium chip computers the instruction sets are different and the conventions for the use of register names are different, but they still serve to help identify the format. In the computers using the Intel chips, references to "AX" for example, refer to a particular register. In a preferred embodiment, the present invention parses comments for assembler program references to inputs and outputs in registers, but not to global variables which might be defined in C programs. For a significant number of system level programs such as operating systems or file systems, parsing comments for register usage at entry and exit is usually sufficient to enable scripting of a wrapper.

Returning to FIG. 1b again, in a preferred embodiment comment parser 10 also searches near a formatter, at step 133, to find a name that might have been assigned to the data in the register. In the example of the payroll program given above, a comment might be written that says "|output d7 gross pay amount $00.00" [underline added for emphasis—does not appear in the comments]. In this example, the text portion following the formatter is taken by the present invention to be the argument name for the data in the formatter, here register d7. In a preferred embodiment, comment parser 10 will delete from the argument name in the comments every word that includes a special character, such as $ or &, or that is enclosed by special characters, and will insert underscore characters between the words to make the name a single item, and thus a "legal" or valid C identifier. Thus, "gross pay amount $00.00" would be truncated at the $ symbol and underscore characters would be inserted between the remaining words so that it will appear as the argument name "gross_pay_amount."

In a preferred embodiment, if the arguments being passed to or from the assembler routine do not have any names that appear in the source code, the present invention enables the user to assign names to them as part of the input parameters to the comment parser. For example, if the source code for the paycheck program described above simply said "output d7" and did not give an argument name to this, the user could supply names to the comment parser. To assign argument names when none are given, the user supplies them as inputs to comment parser 10 as shown in FIG. 5, where the first line is:

Iss6205-Eli-108-sym4>../p /wrap.pl services.s clear_memory_routine a1:name1 a2:name2 and the data following register names a1 and a2 identify the argument names to be used for these two arguments. In this case, the names would be simply name1 and name2.

In a preferred embodiment, this feature of the command line interface of the present invention allows the user to create a wrapper for an assembler routine that does not have documentation, or to add missing parameters.

This is illustrated in more detail in FIG. 4d, where the inputs to the present invention are shown in more detail. As shown in FIG. 4d, following the prompt 490, the implementation name 491 of the present invention is given, followed by the filename 492 containing the source code to be "wrapped." In the example of FIG. 4d, filename 492 is "services.s". Next the name of target routine 493 is given, shown here as "clear_memory_routine". In a preferred embodiment, external argument names 494 and 495, can be specified for arguments that are found in the routine but without internal names. In the example of FIG. 4d, the arguments are identified as such by the prefacing register names a1 and a2. This example shows the use of the words "name1" and "name2" as the external argument names to be used for those two registers in the target routine. If the register is specified in the input or output of the routine, the "name" supplied from the input parameters overwrites the calculated name of the register. If the register is not there, it is added to the registers list. One advantage of this feature of the invention is that it allows the C programmer to correct erroneous documentation in the original program or to supply better documentation if the original is lacking it. Those skilled in the art will appreciate that the input parameters to the present invention could be provided in other formats, such as keyword identifiers, etc. without deviating from the spirit of the invention.

Returning now to FIG. 1b, once a defining term, a formatter and, optionally, an argument name have been found, the present invention stores the results in an associative array at step 140. Such an associative array 480 is shown in FIG. 4c. Referring now to FIG. 4c, the above reference to the contents of register d7 would be stored associatively as shown at line 484. That is, the name "gross_pay_amount" is stored in the array with register d7 and an indicator that this is an output argument. As will be apparent to those skilled in the art, the information could be stored in tables or arrays having other formats while still producing the same results.

Returning to FIG. 1a, at step 15 the invention checks to see if all comments have been parsed, and if they have it proceeds to wrapper scripter 20. If there are more comments to be searched, the present invention returns to step 10.

Figure 1C:
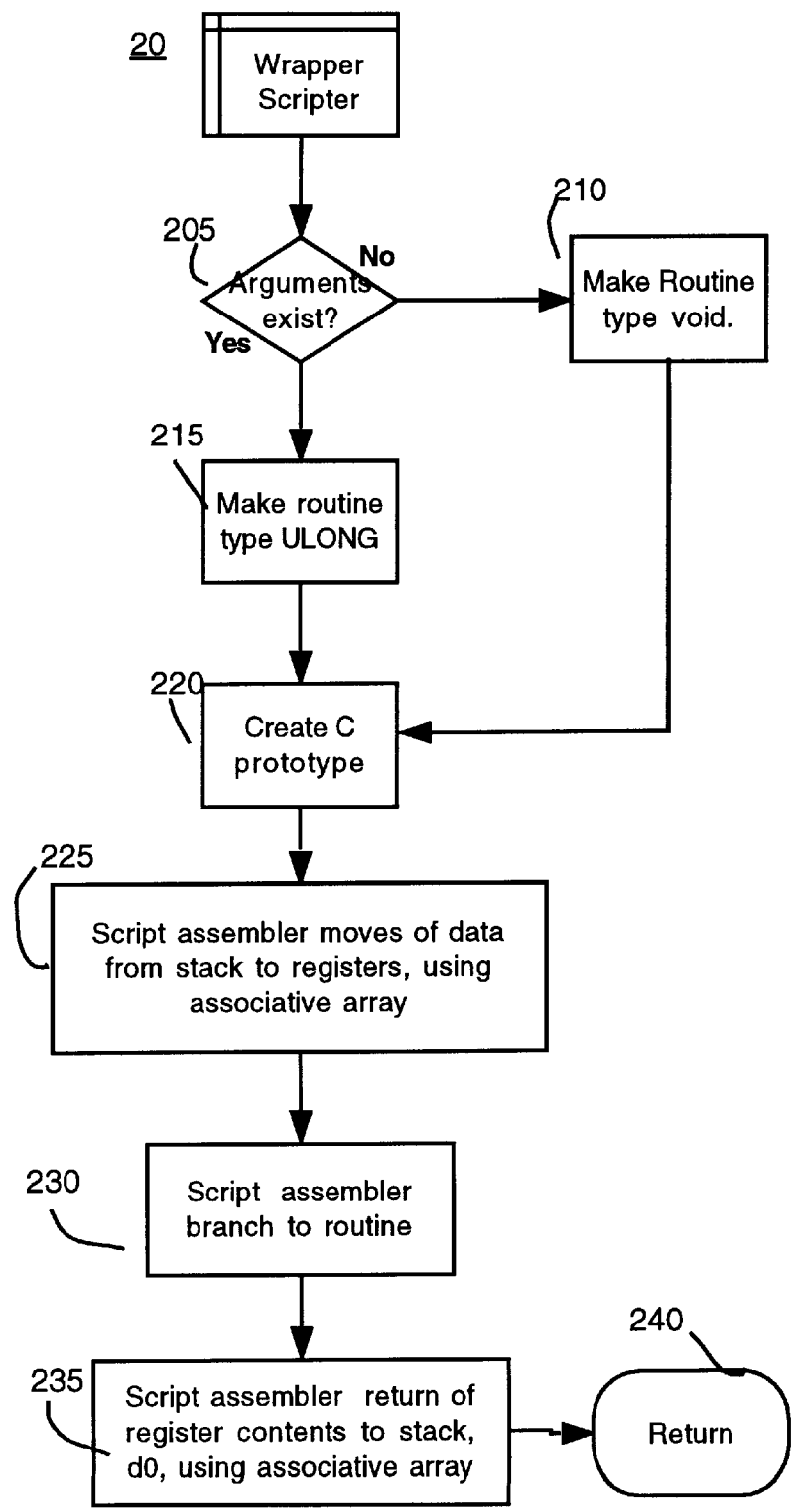
FIG. 1c is a flow diagram of the wrapper scripter of the present invention.
Figure 1D:
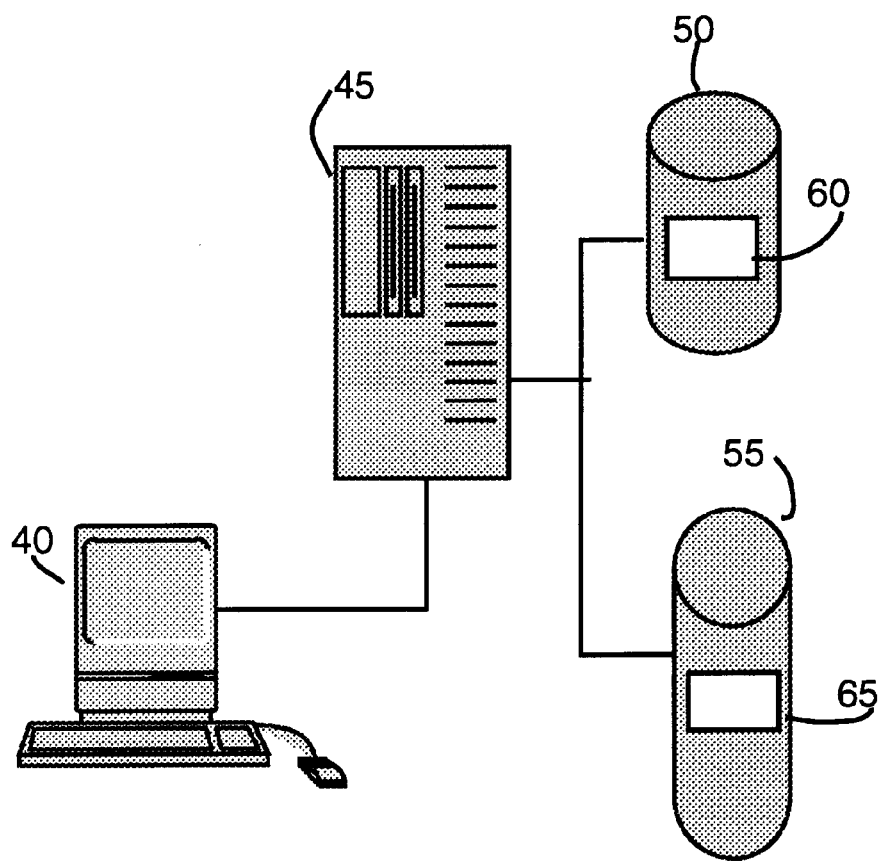
FIG. 1d is a schematic block diagram of a system configuration usable by the present invention.
Figure 1E:
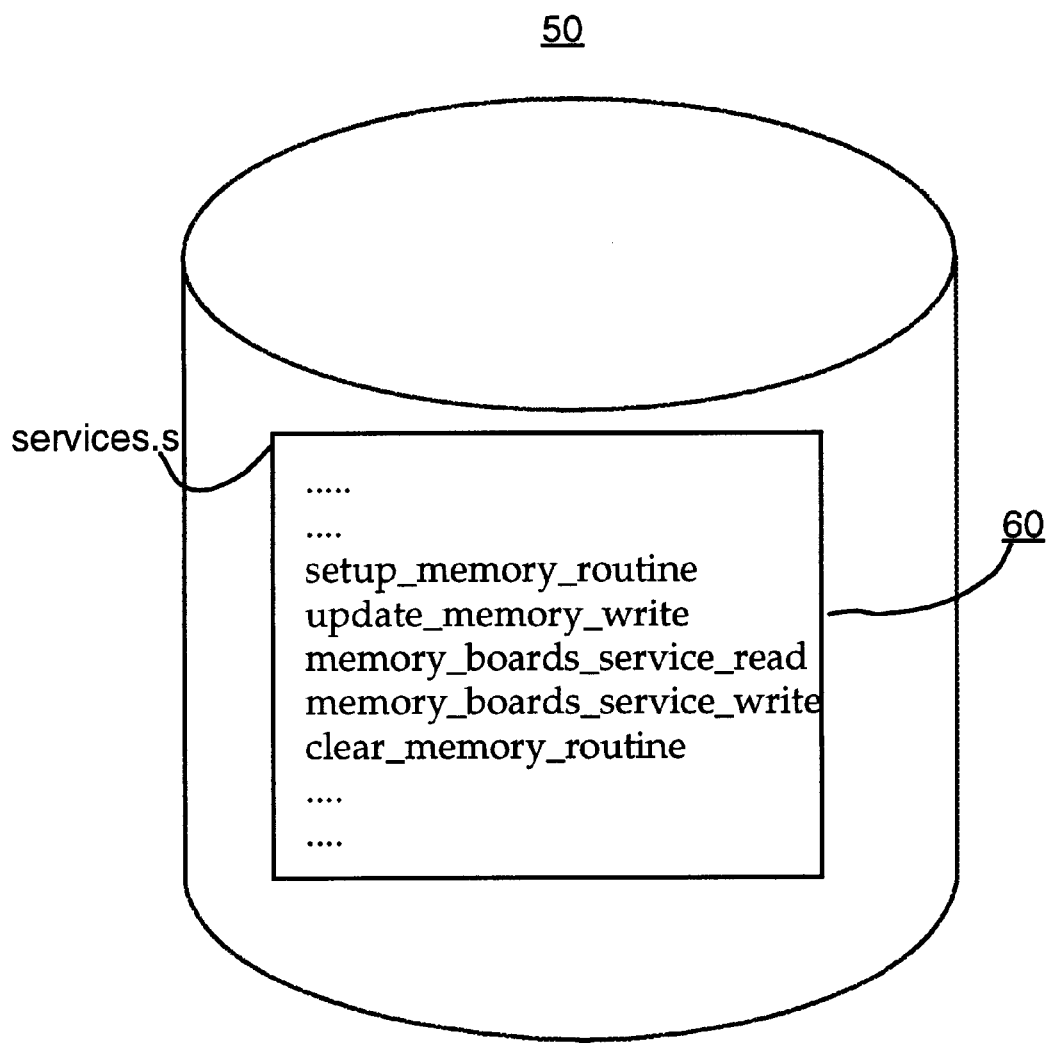
FIG. 1e is a schematic diagram of a source code file.

In a preferred embodiment, wrapper scripter 20, in FIG. 1c, starts, at step 205, by checking to see if any "output" or "at exit" arguments exist. If none exist, the invention sets an indicator at step 210 that will indicate to the prototype builder that the routine type to be used for the C compiler is "void." If, as is more common, there are some arguments being sent to or from this program, a preferred embodiment for C interfaces sets an indicator at step 215 that will make the routine type ULONG. Next, at step 220 wrapper scripter 20 creates the prototype for the C compiler. Those familiar with the C programming language are aware that when a program written in C makes a function call to another program, it is advisable to include a prototype statement in the C program that indicates that the function will be called and whether or not it accepts arguments, and what those arguments are. Similar mechanisms may be used in other languages. In FIG. 5, prototype 510 is such a prototype statement. Similarly, in FIG. 6, prototype 610 is an example of the prototype constructed by the present invention for the C program that will call the wrapper 615 shown there. The C prototype is used to verify that the calling C routine prepares the correct names and types of arguments and expects the correct type of return values.

Returning to FIG. 1c, in a preferred embodiment the present invention, at step 225 scripts the assembler language move commands that will move the register contents from the stack (in the case of the Motorola 68000 implementation) to the content or d registers, using associative array 480. The result of this step is shown in the examples of FIGS. 5 and 6.

In FIG. 5, the present invention has parsed comments section 505 of the assembler source code (which is reprinted in this output display) to discover that on input, register a6 is expected to contain a word address, register d5 to contain a word count, and register d3 to contain a pattern to write. The inputs 500 to the present invention in this case also indicated that register a1 was to be included and named name1, and register a2 to be called name2. Comments section 505 also indicates that register d7 is expected to contain a return code on exit from the assembler routine. Supplied with this information from comments parser 10, wrapper scripter 20 creates not only the C prototype 510, but the wrapper 515. Wrapper 515 in this example, contains as its first line the wrapper name which is constructed by adding an underline character in front of the routine name supplied by the user. In this example in FIG. 5, the user wants a wrapper for "clear_memory_routine" and the invention creates in wrapper 515, the wrapper name "_clear_memory_routine". In a preferred embodiment, the underscore character is used to form the wrapper name because it is typically used to set global functions from local ones.

In a preferred embodiment, wrapper scripter 20 also computes the register set that should be saved or restored by the wrapper. If the assembler routine returns values in register d0, wrapper scripter 20, in a preferred embodiment, will not allow this register to be saved or restored.

Still in FIG. 5, following the wrapper name in wrapper 515, the first line of code:

movem.l a1/a2/a6/d3/d5/d7,-(a7)

saves the registers wrapper scripter 20 has calculated that the routine will use —a1,a2,a6,d3,d5,d7—onto the stack, pointed to by register a7, by auto-decrementing it, thus saving their contents at the next location on the stack. The next line of wrapper 515:

move.l 28(a7),d5 word_count moves the data at offset 28 from the current location of the stack, pointed to by register a7, into register d5. The remaining lines of wrapper 515 continue to move data from the current stack pointer into the registers used by the routine, in the order in which they would be stored on the stack. Again, wrapper scripter 20 calculates these offsets from the stack. This means the present invention is more likely to eliminate errors caused by erroneous manual calculations. Since the same wrapper scripter 20 that calculated these offsets also creates the C prototype, this helps insure that the arguments identified in the C prototype will be placed at the appropriately corresponding offsets in the stack by the C program, again reducing the likelihood of error or mistake.

As part of the output created by wrapper scripter 20 in this example, a branch to the assembler routine is included in wrapper 515 at the line:

bsr clear_memory_routine which will cause the wrapper code to transfer control to the routine clear_memory_routine when the wrapper is called by the C program.

Returning now to FIG. 1c, this branch would have been generated at step 230. Next, at step 235, wrapper scripter 20 would script the assembler code that will be executed in the wrapper when the routine returns to it.

Turning again to FIG. 5, in wrapper 515, after the bsr instruction, this is seen in the lines:

move.l d7,d0 return_code
movem.l (a7)+,a1/a2/a6/d3/d5/d7
rts where the first move instruction moves the return value from register d7, where the assembler routine put it, to register d0 where the C program will expect to find it. The next move instruction restores the registers from the stack by "popping" them off the stack pointer in register a7. Finally, the last line of wrapper 515 includes a return to the C program at "rts".

In a preferred embodiment, both comment parser 10 and wrapper scripter 20 are written in the Perl programming language. Those skilled in the art will appreciate that they could also be written in C or assembler or other languages. Similarly, while a preferred embodiment is written in software stored on disks and loaded into the computer, those skilled in the art will appreciate that it could also be implemented in firmware or circuitry in a computer.

Those skilled in the art will appreciate that the embodiments described above are illustrative only, and that other systems in the spirit of the teachings herein fall within the scope of the invention.

What is claimed is:

1. A programming development apparatus for automatically creating interfaces between computer programs written in different computer languages, comprising:

a comment parser for parsing the commented section of a first computer program written in a first computer language to identify the defining terms, and formatters of arguments and associating them into related groups;

a memory array for storing the related groups of arguments;

a wrapper scripter for scripting a wrapper in code written in the first computer language to transform arguments stored in the memory array from the format used by a second computer program written in a second computer language to the format used by the first computer program, and from the format used by the first computer program to the format used by the second computer program so that the second computer program is able to call the first computer program and send arguments to the first computer program and also receive arguments from the first computer program when the first computer program returns.

2. The apparatus of claim 1, wherein the comment parser further comprises a means for identifying argument names.

3. The apparatus of claim 1, wherein the wrapper scripter further comprises a prototype builder for creating a prototype statement for the second computer program.

4. The apparatus of claim 3, wherein the prototype builder further comprises a means for indicating whether the first computer program expects arguments.

5. The apparatus of claim 1, wherein the comment parser further comprises a means for accepting external names to be added to arguments located in the commented section of the first computer program.

6. The apparatus of claim 1, wherein the memory array is an associative memory array.

7. A programming development method for automatically creating interfaces between computer programs written in different computer languages, comprising the steps of:

parsing the commented section of a first computer program written in a first computer language to identify the defining terms, and formatters of arguments and associating them into related groups;

storing the related groups of arguments in a memory array;

scripting a wrapper in code written in the first computer language to transform arguments stored in the memory array from the format used by a second computer program written in a second computer language to the format used by the first computer program, and from the format used by the first computer program to the format used by the second computer program so that the second computer program is able to call the first computer program and send arguments to the first computer program and also receive arguments from the first computer program when the first computer program returns.

8. The method of claim 7, wherein the step of parsing further comprises the step of identifying argument names.

9. The method of claim 7, wherein the step of scripting further comprises the step of creating a prototype statement for the second computer program.

10. The method of claim 9, wherein the step of creating a prototype further comprises the step of indicating whether the first computer program expects arguments.

11. The method of claim 7, wherein the step of parsing further comprises the step of accepting external names to be added to arguments located in the commented section of the first computer program.

12. The method of claim 7, wherein the step of storing in memory array further comprises the step of storing in an associative memory array.

* * * * *